Figure 8:
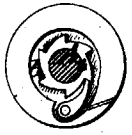

J. P. MANNY.
Harvester.
No. 6,382. Reissued April 13, 1875.
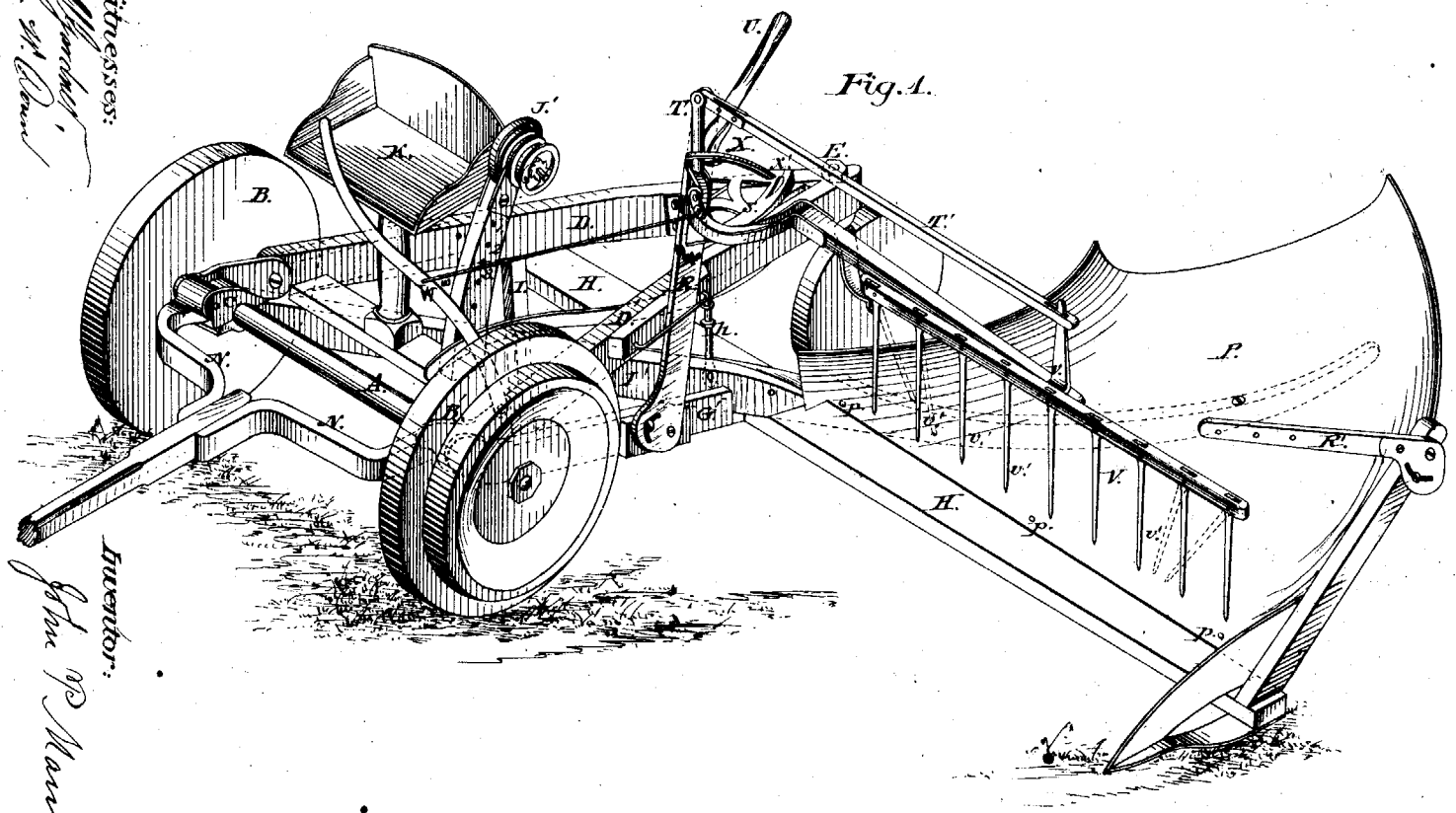
Witnesses:
M. Goodwin,
Ed. W. Down
Inventor:
John P. Manny
THE GRAPHIC CO. PHOTO-LITH. 39 & 41 PARK PLACE, N.Y.

J. P. MANNY.
Harvester.
No. 6,382. Reissued April 13, 1875.
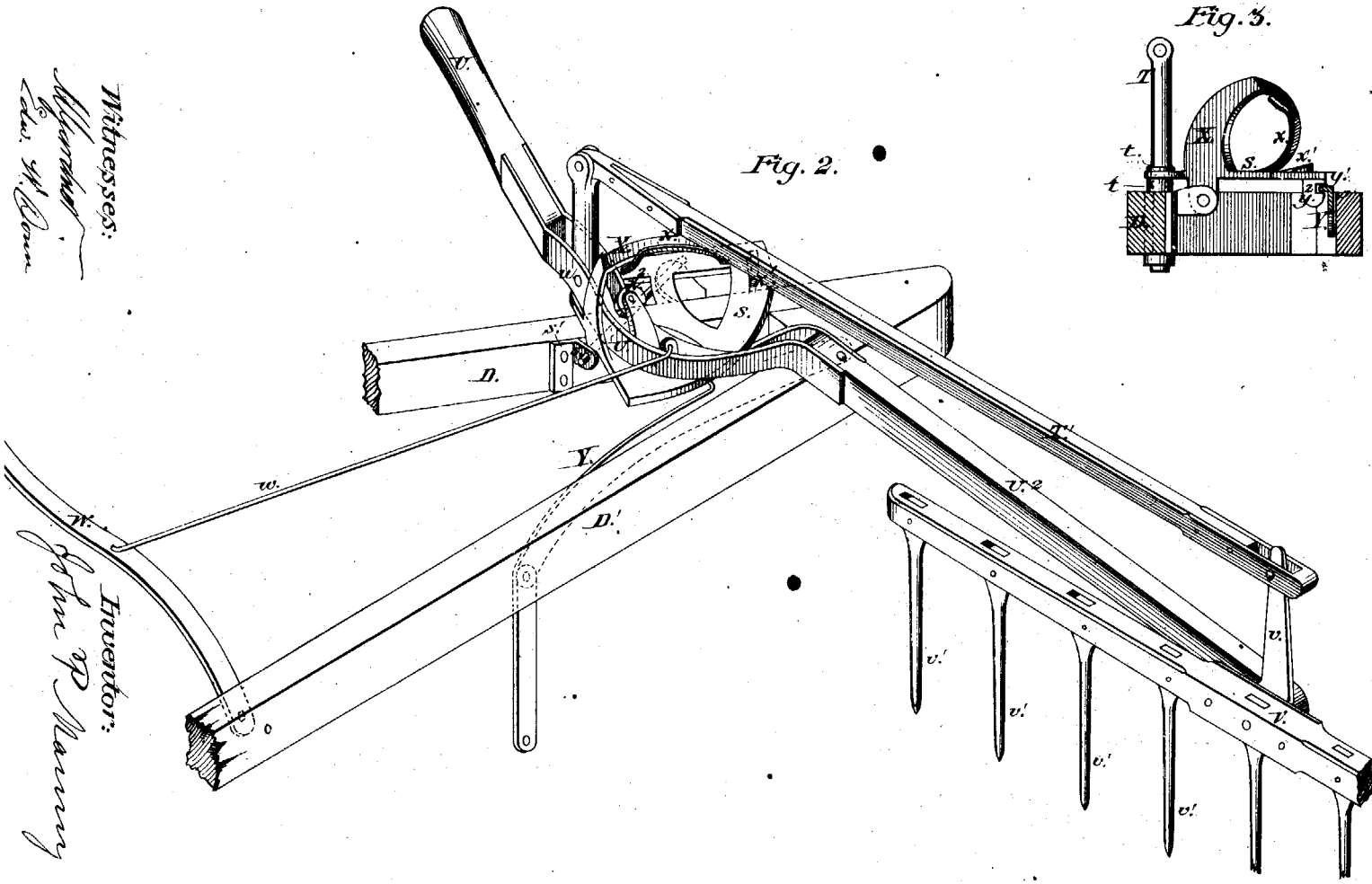
Witnesses:
M. Gardner
Edw. H. Down
Inventor:
John P. Manny
THE GRAPHIC CO. PHOTO-LITH. 39 & 41 PARK PLACE, N.Y.

5 Sheets--Sheet 3.
J. P. MANNY.
Harvester.
No. 6,382.
Reissued April 13, 1875.
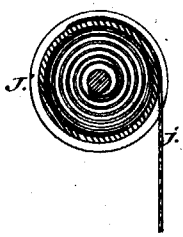
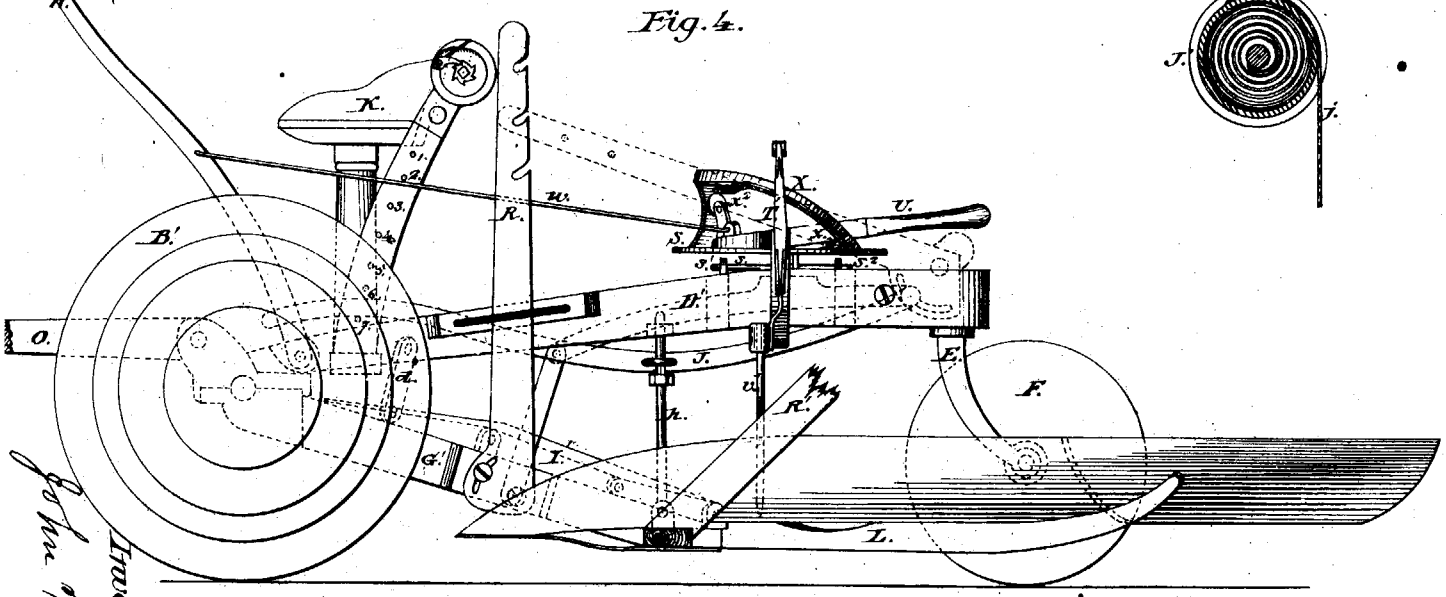
Witnesses:
M. Gardner
Ed. H. Conant
Inventor:
John P. Manny
THE GRAPHIC CO. PHOTO-LITH. 39 & 41 PARK PLACE, N.Y.

5 Sheets--Sheet 4.
J. P. MANNY.
Harvester.
No. 6,382.
Reissued April 13, 1875.
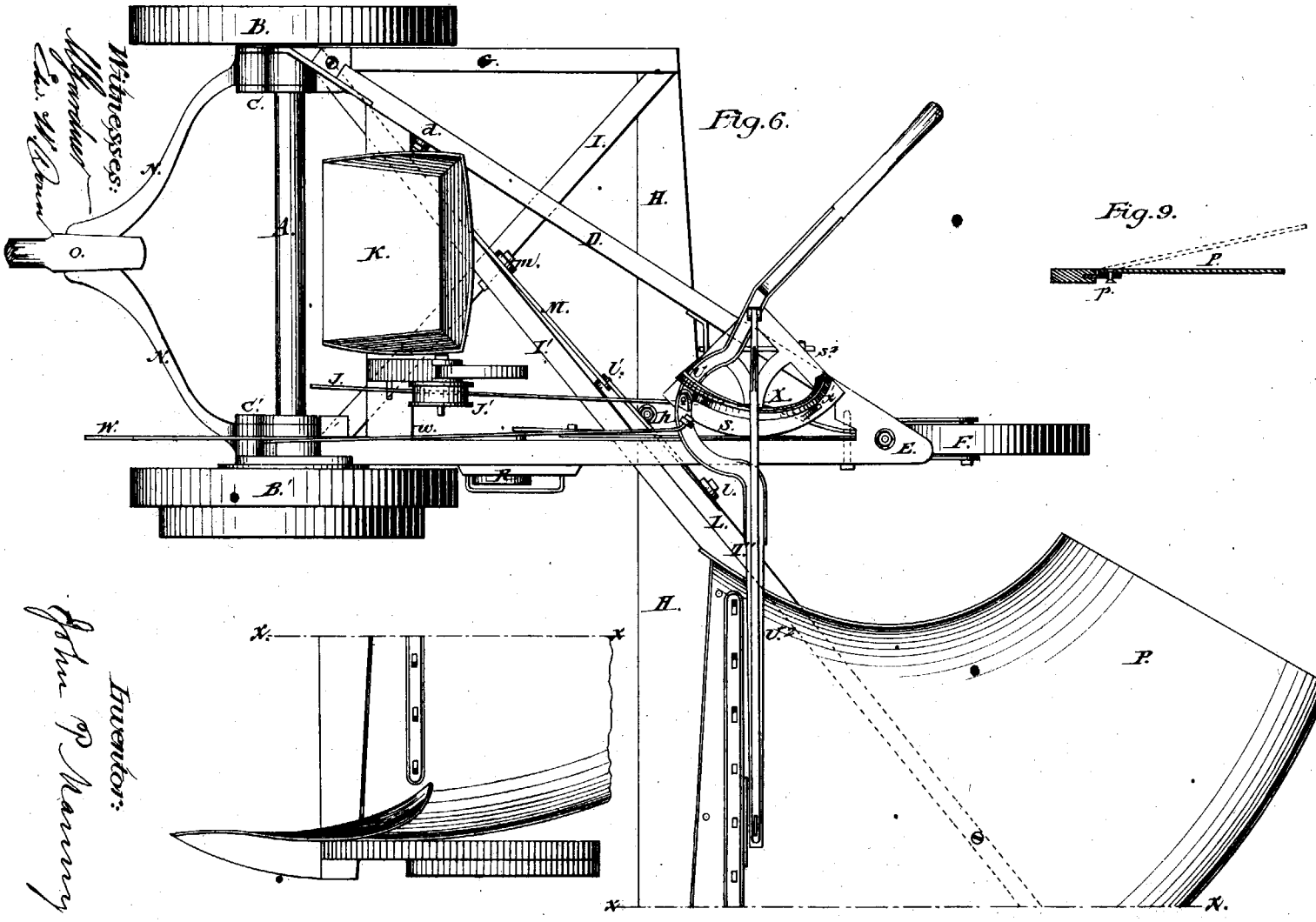
Witnesses:
M. Gardner
Edw. W. Dunn
Inventor:
John P. Manny
THE GRAPHIC CO. PHOTO.-LITH. 39 & 41 PARK PLACE, N.Y.

J. P. MANNY.
Harvester.

No. 6,382. Reissued April 13, 1875.

Witnesses:
A. Gardner
Edw. H. Conn

Inventor:
John P. Manny

THE GRAPHIC CO. PHOTO-LITH. 39 & 41 PARK PLACE, N.Y.

UNITED STATES PATENT OFFICE.

JOHN P. MANNY, OF ROCKFORD, ILLINOIS.

IMPROVEMENT IN HARVESTERS.

Specification forming part of Letters Patent No. 17,798, dated July 14, 1857; reissue No. 3,581, dated August 3, 1869; extended seven years; reissue No. 6,382, dated April 13, 1875; application filed March 18, 1875.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The improvements constituting my invention relate to that class of harvesters known as combined or convertible machines—that is to say, machines the organization of which is such as to permit of their ready adaptation to use either as reapers or mowers.

Harvesting-machines for reaping grain, constructed with reels, a grain-platform, and a raking mechanism for removing the cut grain from the platform, were well known prior to the date of the present invention. Mowing-machines had also been constructed provided with a finger-beam, but without a grain-platform or raking mechanism; and of this class of harvesters the most approved kind were those in which the finger-beam and cutters had the capacity of rising and falling independently of the movements of the driver's platform, so as to conform freely to the undulations of the ground. Reaping-machines of certain kinds had also been made with detachable platforms to adapt them to mowing.

The improvements herein described have reference to the construction of a harvester for reaping grain, the organization being such that, while useful for this purpose, it may also be transformed, as occasion may require, into a practical mowing-machine.

The chief features aimed at in the construction of such a machine are the free undulation of the finger-beam in mowing, to enable the cutters to conform to the inequalities of the ground, and, when the machine is used for reaping, the capacity in the finger-beam of being raised and held at any desired and uniform height, (with freedom to rise above that height when encountering an obstacle,) the harmonious relation and co-operation of the reel and the raking devices with the grain-platform and the finger-beam being preserved whatever the elevation of the finger-beam may be.

To this end my invention consists of certain new combinations of the following elementary members of reaping and mowing machines, viz: a main carrying-frame supporting a seat for the driver or conductor of the machine, and carrying the finger-beam and connected parts when the same are raised above the ground, as in reaping; two main running-wheels, to the axle of which the carrying-frame and its connected parts are attached in any convenient way, one or both of such wheels acting as drivers to impart motion to the cutting mechanism; a finger-beam for supporting the cutting apparatus, arranged to project laterally at one side of the carrying-frame and the main wheels; a platform attached to the finger-beam for receiving the cut grain; reel-supports for sustaining the reel, by which the grain is pressed back toward the cutters and the platform, such reel-supports being so connected with the finger-beam as to partake of its vertical movements; a rake arranged in relation to the finger-beam and the grain-platform, so as to sweep over the latter and discharge the cut grain therefrom; a flexible or hinge connection between the finger-beam and the carrying-frame, whereby the finger-beam and the connected parts, while they are caused to move forward with the carrying-frame, have the capacity of rising and falling with the undulations of the ground independently of the vertical movements of such frame; a lifting-lever connected with the carrying-frame, by means of which, through suitable connections, the driver may regulate at pleasure the height above the ground of the finger-beam, and the platform, reel-supports, and other parts connected therewith; a cam-guide for controlling the movements of the rake over the platform, the guide being so connected with the rake and platform as to preserve the relative adjustment of the two at the different elevations of the finger-beam.

The combinations of these various members, which I regard as constituting my invention, are set forth in detail at the close of this specification.

In order that they may be fully understood, I have represented in the accompanying drawings, and will proceed to describe, the principal parts of the machine in which I have embodied them, the parts omitted from the drawings being such as are well understood by builders of harvesters.

Figure 7:
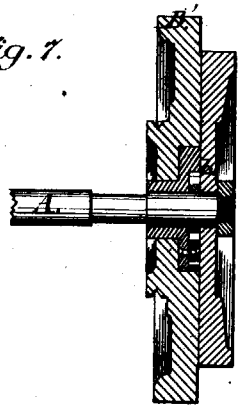
Figure 10:
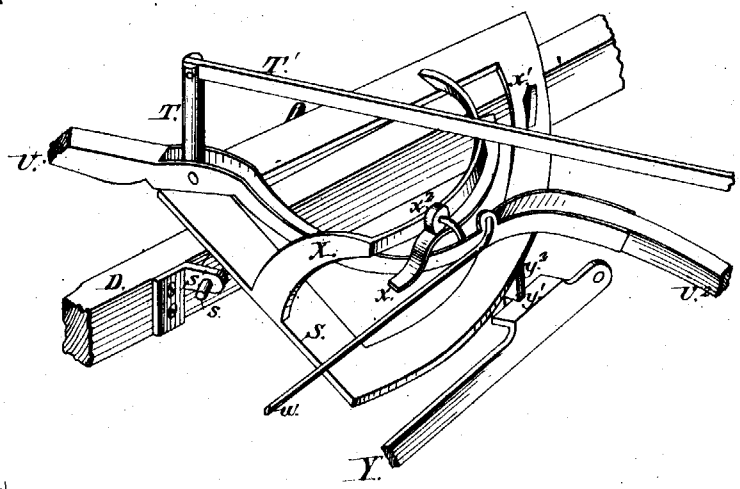

In the accompanying drawings, Figure 1 represents a view, in perspective, of so much of a harvester embracing my improvements as is necessary to illustrate the invention herein claimed, as seen from the divider side thereof. Fig. 2 represents a similar view, on an enlarged scale, of the raking apparatus, detached. Fig. 3 represents a view, in elevation, of the rake-supporting devices, detached, and seen from the front. Fig. 4 represents a view, in elevation, of the machine, as seen from the divider side thereof. Fig. 5 represents a vertical section through the lifting-drum. Fig. 6 represents a plan or top view of the machine. Fig. 7 represents a vertical transverse section through the inner driving-wheel. Fig. 8 represents one of the backing-ratchets. Fig. 9 represents a vertical section through the platform at the line *x x* of Fig. 6. Fig. 10 is an enlarged perspective view of the cam-guide and the connected parts.

The carrying-frame in the machine here represented is composed of two pieces, D D′, and a strengthening cross-piece, which connects them near their forward end. This frame is supported at its forward end by attachment to the boxes C C′, in which the axle of the two driving-wheels B B′ revolves, and at its rear end by the caster-wheel F, which turns freely upon the spindle or pivot E. It will be seen that by this construction the relative position of the carrying-frame and the surface of the ground will be substantially maintained as the machine moves forward, whatever the inequalities of the ground may be. The driver's seat K is mounted upon this carrying-frame in a convenient position. Two main supporting-wheels, B B′, are constructed to turn freely upon their axle A, being also connected with it by suitable backing-ratchets *b*, as shown in Figs. 7 and 8, so that one or both of said wheels may operate to turn said axle, and thus drive the mechanism connected therewith. The finger-beam H projects laterally at the side of the carrying-frame and the path of the driving-wheels, so that it occupies the position relatively to them of the floating finger-beam of side-cut mowing-machines. Behind the finger-beam, and suitably connected therewith, is the grain-platform P, and a rake, V, is arranged to sweep over this platform, for the purpose of removing the grain therefrom. The rake-head is connected with a radial arm, $U^2$, which is pivoted at *u* to an upright rake-shaft, T, which turns freely in its bearings on the carrying-frame, so that the rake is caused thereby to move in a circular path over the platform. The rake-arm $U^2$, by which the rake is carried, is supported and controlled in its movements by the cam-guide S X, this cam-guide being so arranged, in relation to the rake and platform, as to cause the former to rise and fall correspondingly with the vertical movements of the latter, and being so constructed that the teeth of the rake will move sufficiently near to the surface of the platform, when the rake is passing from front to rear, to engage with the cut grain, but will be lifted up and carried over the grain when moving in the opposite direction. To produce this last effect, the raised part X of the cam-guide is provided with a cam ledge or upper track, *x*. As the rake moves rearward over the platform, the arm $U^2$ is supported upon the lower track or plate of the cam-guide, and is prevented from rising by means of the friction-roll $x^2$, which is borne upon a standard attached to the rake-arm, and which would strike against the under side of this cam-ledge or upper track if the rake-arm should begin to rise. When the rake has passed out to the end of the platform where it is to deliver the gavel, the rake-arm runs up the incline station on the rear of the lower track of the cam-guide, and the friction-roll $x^1$ having passed out from under the lower end of the upper track, it mounts such upper track on the return movement of the rake, and thus holds the rake above the platform until the roll reaches the forward end of the track, when the rake is permitted to descend upon the cut grain. A downward bend at the forward end of the upper track permits the rake-head to pass under the reel-ribs when the rake is operated in connection with reel-ribs revolving on a horizontal axis. By placing the two tracks which form the main part of this cam-guide at the stubble side of the machine, between the rake-head and the upright shaft on which the rake turns, it will be entirely out of the way of the falling grain.

Two different modes of operating the rake are shown in the drawings. One is by means of the radial handle U; the other is by means of the lever W and connecting-rod *w*, the lever W being within easy reach of the driver, so that he can operate the rake from the driver's seat.

I do not claim, however, that my invention in any way consists in or is limited by the means adopted for giving to the rake its forward and backward movements.

Reel-supports R R′ are provided for holding the shaft of an ordinary gathering-reel. These supports are pivoted at their lower ends, and provided with slots and set-screws, so that they can be adjusted forward and backward, as occasion may require.

In order that the finger-beam, the reel-supports, and the grain-platform may all be raised and lowered simultaneously, relatively to the ground and to the carrying-frame, as required for reaping, the finger-beam is connected with the carrying-frame by a hinge-connection. The hinge-connection in the machine shown in the drawings is formed at the points where the upper frame is pivoted to the boxes C C′. As the lower frame (which consists of the bars G G′ and the diagonal braces I I′) is attached at its upper end to these same boxes, and the finger-beam is attached to the lower end of this lower frame, this construction permits the finger-beam to be adjusted vertically, relatively to the carrying-frame, as described.

The inner reel-support, as shown in the drawings, is connected with the finger-beam through the intervention of the bar G′, and the outer reel-support through the intervention of a post secured to the divider end of the finger-beam. The grain-platform is secured to the finger-beam by means of hinges *p*, and thus, whenever the finger-beam is raised or lowered relatively to the upper carrying-frame, through the hinge-connection which unites the two, the reel-supports and the platform, being attached to or connected with the finger-beam, are raised or lowered to the same extent.

The relative adjustment of the rake and the platform is maintained under all the varying elevations of the latter by means of the cam-guide S X, in the following manner: The cam-guide, instead of being made fast to the carrying-frame, is pivoted to one of the bars thereof by means of the pin or rod *s*, which rests in the boxes $s^1$ $s^2$. The inner end of the guide is provided with a fork, which embraces the rake-standard T, between the two fixed collars *t*. As the rake-arm is pivoted horizontally at *u* to the standard T, which is free to turn upon its axis, and also to move up and down in its bearing, and as the rake-arm is further supported upon the upper face of the cam-guide, it follows that, whenever the cam-guide is rocked upon the pin or shaft *s*, the vertical position of the outer end of the rake-arm, and thus also the vertical position of the rake-head, will be correspondingly changed. The cam-guide is caused to rock automatically upon its shaft by means of the lever Y, pivoted to the bar D′ of the carrying-frame, and the slotted stud $y^2$ upon the under side of the cam-guide. A horizontal flange, $y^1$, upon the lever Y takes loosely into the slot in the stud $y^2$, while the forward end of the lever Y is connected with the lower or adjustable frame of the machine by means of a pivoted rod or link. Thus, whenever the finger-beam, to which the platform is attached, is raised or lowered, the cam-guide is automatically rocked upon its shaft, and the elevation of the rake, which is controlled by the cam-guide, is changed simultaneously and to a corresponding extent.

In order to maintain the parallelism of the rake when it is raised and lowered, the rake-head is connected by a pivot with the rake-arm $U^2$, and is provided with an upright arm, *v*, which is connected, by a radius-bar, T′, and pivots, with the upper end of the rake-shaft T. As the radius-bar is of the same length as the rake-arm from its pivot to the pivot of the rake-head, and as the upright arm *v* is of the same length as the length of the rake-shaft between the pivot of the rake-arm and the pivot of the radius-bar, the rake-head is caused to maintain its parallelism with the platform when sweeping over the latter, notwithstanding it is raised or lowered simultaneously with the raising and lowering of the finger-beam.

In order that the finger-beam, the grain-platform, and the connected parts may be suspended, in reaping, from the carrying-frame, a suspension device, *h*, is provided, which is connected at its lower end with the finger-beam, and at its upper end with the carrying-frame; and in order that the same device, which is so attached to the finger-beam as to constitute a yielding or flexible connection, may be used to raise and lower the finger-beam and the parts connected therewith, its upper end is connected with the carrying-frame through the intervention of a lifting-lever, J. This lever is pivoted at its rear end to the carrying-frame, while its front end passes forward within reach of the driver on the seat K, so that he is enabled from his seat to raise and lower the finger-beam and the platform, and the other parts connected therewith, in reaping, or the finger-beam and cutters in mowing.

The finger-beam and connected members may be temporarily secured at any particular elevation to which they may be raised by means of a standard arranged at the side of the driver's seat, and provided with a series of holes, for the insertion of a retaining-pin under the lifting-lever, the front end of which traverses alongside the standard. The effective length of the suspension device may be varied, if required, by means of the nut screwed upon its upper end, above the eye upon the lifting-lever, through which it passes. A second nut arranged upon this suspension device, below the lifting-lever, serves as a collar, against which the lever may be made to bear whenever the driver finds it necessary to press down upon the cutting apparatus to hold it to the ground. The horizontality of the platform during the vertical oscillations of the finger-beam is maintained by means of a lever, L, and its connections. This lever is pivoted to the finger-beam at *l*, and is connected at its forward end *l′* with one end of a second lever, M, which is pivoted to one of the diagonal braces of the lower adjustable frame, and has its other end connected with the upper carrying-frame by means of the links *d*. As the lever L reaches under and is attached to the platform, and the platform is connected with the finger-beam by hinges, this construction causes the platform to turn slightly upon its hinges as the finger-beam rises and falls, and thus its horizontality is preserved.

When the machine is to be used for mowing, in order to prevent its bearing too heavily upon the ground, and thus unduly increasing the draft, and to facilitate the lifting of the finger-beam, a portion of the weight of the finger-beam and connected parts is sustained by a coiled spring. For this purpose a stationary spring-drum, J′, is mounted upon a standard on the carrying-frame. Through this drum there passes a shaft, upon which is mounted a pulley, turning freely thereon in one direction, but held from turning in the other by a pawl and ratchet. One end of a coiled spring is secured to the inner periphery of this drum, and the other end to the aforesaid shaft. A cord or chain connects the pulley with the lifting-lever J. By turning the shaft the spring may be wound up and held at any desired tension. The tension of this spring, acting through the lifting-lever and the suspension device, reduces the pressure of the finger-beam upon the ground, while allowing the crop to be closely cut.

In the machine shown in the drawings, the grain-platform is not only curved to conform to the circular sweep of the rake, but it is contracted at its delivery side, so as to condense the gavel before it is discharged upon the stubble. The rake is also specially adapted for operation in connection with such a platform, by having the outer teeth pivoted, so as to swing laterally in the plane of the rake-head, by which means the teeth are pressed toward each other by the converging sides of the platform as the rake moves toward the delivery side, but return again to their vertical position as the rake lifts up on its forward movement. In order to prevent the rake from dragging or scattering the gavel when it is discharged upon the stubble, a sharp incline, $x^1$, is formed upon the lower track of the cam-guide at its rear end; the position of this incline in relation to the delivery side of the platform being such that the moment the gavel is lodged upon the stubble the rake-arm is brought in contact with the face of the incline, by which means the rake itself is thrown suddenly upward and entirely disengaged from the grain of the gavel. The machine is drawn forward by means of the tongue O, which connects with the main frame of the machine by the hounds N N, pivoted to the boxes C C′.

The object of thus making a hinge-connection between the pole and the carrying-frame, which, by consequence, has to be provided with a caster-wheel support at the rear, is to relieve the horses' necks, as far as possible, from the shock and strain that are apt to occur when the carrying-frame and pole are rigidly connected. It will be readily understood, however, that my invention in no wise relates to the mode in which these two parts are connected.

Various essential elements of a harvesting-machine, such as the cutters, the gearing, and other members, are not exhibited in the accompanying drawings, since the invention in no way relates to these omitted parts, and their construction is well understood by builders of this class of machines.

It will be seen that in a machine constructed as hereinbefore described, when it is desired to use the same for reaping, the finger-beam and the various members connected with it, such as the platform, the reel-support, and the rake, can be lifted up and sustained by the carrying-frame at any required distance from the ground, the construction being such that these various parts automatically maintain their relative adjustment, and act harmoniously in relation to each other, whatever be the elevation they are made to assume; and when the machine is used for mowing, (the grain-platform and the raking apparatus being detached,) the finger-beam with the cutters can be lowered upon the ground, with the capacity of rising and falling with the undulations of the same, independently of the vertical movements of the carrying-frame, upon which the driver is mounted, by reason of the flexible or hinge connection between the finger-beam and the upper or carrying frame. In this transformed condition the finger-beam projects laterally at one side of the carrying-frame, and of the main driving-wheels, and as there is no extension of the carrying-frame to the outer or grain end of the finger-beam, and as the finger-beam is free to rise and fall with the undulations of the ground, with the capacity of being raised by the driver at pleasure to pass obstructions, the machine possesses the essential characteristics of an efficient side-cut mower.

What I claim as new, and as constituting my invention, is—

1. The combination, in a combined reaper and mower, of two main wheels, a carrying-frame, a finger-beam projecting laterally at the side of the carrying-frame and the path of the main wheels, a hinge-connection between the finger-beam and the carrying-frame, for the purposes hereinbefore described, a grain-platform attached to the finger-beam, a rake moving over the platform in a curved path, and a cam-guide for regulating the movements of the rake, such cam-guide and rake vibrating in unison with the vertical movements of the finger-beam and platform, so as to preserve the relative adjustment of the rake and platform, substantially as and for the purpose described.

2. The combination, in a combined reaper and mower, of two main wheels, a carrying-frame, a finger-beam projecting laterally at the side of the carrying-frame and the path of the main wheels, a hinge-connection between the finger-beam and the carrying-frame, for the purposes hereinbefore described, a grain-platform attached to the finger-beam, a rake moving over such platform in a curved path, and conforming automatically to the vertical movements of the same, and a lever pivoted on the carrying-frame, by means of which the driver may at will change the height of the finger-beam and its connected parts, in either mowing or reaping, from his seat, and without stopping the machine, substantially as and for the purpose described.

3. The combination, in a harvester, of a carrying-frame, a finger-beam vertically adjustable relatively thereto while the machine is in motion, a grain-platform attached to such finger-beam, and a sweep-rake moving over such platform in a curved path, and conforming automatically to its different elevations, the combination being and operating substantially as set forth.

4. The combination, in a harvester, of a carrying-frame, a finger-beam and platform connected with the carrying-frame by a hinge-connection, mechanism for suspending the finger-beam from the carrying-frame at different heights, a rake moving over the platform in a curved path, and a cam-guide for regulating the movements of the rake, such cam-guide and rake vibrating in unison with the vertical movement of the finger-beam and platform, so as to preserve the relative adjustment of the platform and rake, substantially as described.

JOHN P. MANNY.

Witnesses:

PHILLIPS ABBOTT,

ROBERT H. DUNCAN.